United States Patent [19]

Duffy

[11] 4,395,449
[45] Jul. 26, 1983

[54] PREFORMS FOR REINFORCEMENT OF BATTERY GRIDS

[75] Inventor: Joseph J. Duffy, Newark, Del.

[73] Assignee: E. I. Du Pont de Nemours and Company, Wilmington, Del.

[21] Appl. No.: 390,537

[22] Filed: Jun. 21, 1982

[51] Int. Cl.³ .............................................. B32B 5/12
[52] U.S. Cl. ..................................... 428/105; 156/80; 156/296; 264/28; 428/114; 428/198; 428/288; 428/360; 428/408
[58] Field of Search ............... 428/105, 107, 108, 113, 428/198, 288, 408, 360, 114; 156/80, 296; 264/28

[56] References Cited

U.S. PATENT DOCUMENTS 3,632,460  1/1972  Palfreyman et al. .
3,828,839  8/1974  Dhingra .
4,282,922  8/1981  Hartmann .

FOREIGN PATENT DOCUMENTS 1567328  5/1980  United Kingdom .

*Primary Examiner*—James J. Bell

[57] ABSTRACT

Network preforms for battery grids are prepared from cross-lapped assemblages of spaced bundles of inorganic filaments which are bonded at crossover points by ice.

7 Claims, 2 Drawing Figures

F.I G. 1
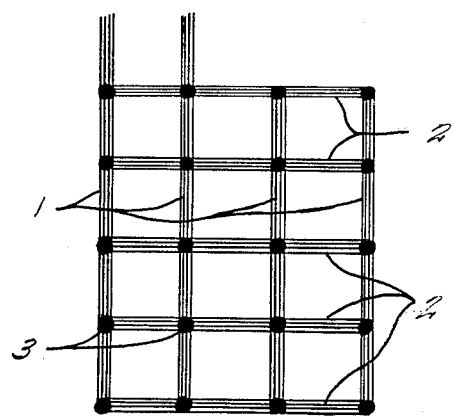
F I G. 2
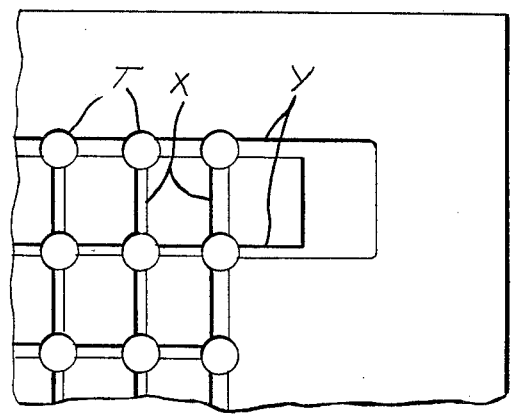

PREFORMS FOR REINFORCEMENT OF BATTERY GRIDS

BACKGROUND OF THE INVENTION

This invention relates to improved techniques for battery grid manufacture. Lead-acid batteries and their operation are well-known. The grids are the support for the active material of the plates and conduct the current to and from the active materials. The grid must be corrosion resistant and must possess sufficient strength and stiffness to prevent damage or distortion during manufacture of the grids, preparation of the plate from the grid and construction of the battery itself. Pure lead is the most corrosion resistant material for lead-acid battery grids, but it is weak and tends to creep. In use, the grids are subject to stress due to their own weight and the weight of active material supported by the grids and the stresses imposed through expansion and contraction of the active material in the charge-discharge cycle. If the grids are broken during use, the active material is isolated or shed and lost for the electrochemical reaction. From the standpoint of economies of weight, cost and cell capacity, grid thickness is also a significant factor.

Battery grids are generally made by a casting process. The grid-casting machine consists of a book or center-parting grid mold, trimming mechanism and melting pots. The grid mold consists of two cast iron parts, each with a grid design for a face. In order to avoid premature solidification the mold is heated before introduction of the molten metal. The lead or lead alloy is first melted in the melting pots and transported to the grid mold. After the mold is filled with molten metal, it is allowed to cool. It is then opened, the cast grid is removed and the operation begins anew for fabrication of the next grid. This is done on a mass production schedule and it is important that no undue delay occurs in the cycle.

Alloys are generally used as the preferred grid material because pure lead is easily deformed. The proper selection of the lead alloy depends on the intended use and economics of the lead-acid battery application because the alloys often introduce other problems such as cost, corrosion, difficulties in manufacture or reduced battery life.

Reinforcement of grids is a relatively new concept and shows promise of resolving many of the problems mentioned above. Efforts to use fiber to reinforce the grid structure have been found to present new problems in manufacture. Hand lay-up of filaments in the open casting mold is a time-consuming operation that is inconsistent with mass production techniques. Also, conditions around the grid casting area are not conductive to careful hand lay-up of the filaments. In some cases handling of the filaments causes discontinuities and breaks. When this occurs in the casting mold, it results in poor quality grids. The novel preform of the instant invention offers a solution to these problems.

SUMMARY OF THE INVENTION

This invention provides a network sheet preform for reinforcement of a lead or lead alloy battery grid comprising an array of spaced bundles of inorganic filaments superimposed upon and directionally displaced from another array of spaced bundles of inorganic filaments, said arrays being bonded to each other at the filament bundle crossover points with a fugitive binder having a melting point of at least about 0° C. and a boiling point below about 300° C. The spaced bundles in each array are preferably essentially parallel to each other. Also provided is a method for making preforms comprising depositing bundles of inorganic filaments in the grooves of a fixture having a group of grooves intersecting another group of grooves, wetting the filament bundles with the fugitive binder at a temperature above its melting point, freezing the fugitive binder thereby bonding the filamentary bundles at crossover points and removing the frozen preform from the fixture.

DESCRIPTION OF THE DRAWING

FIG. 1 is a schematic of a preform.
FIG. 2 is a schematic of a section of a preform fixture.

DETAILED DESCRIPTION OF THE INVENTION

The preform of the invention is a grid or skeletal framework preferably for reinforcement of a lead or lead alloy battery grid. It may correspond in configuration to a battery grid and comprises a preformed sheet structure wherein an array or assemblage of spaced bundles of inorganic filaments lying in a single plane is bonded with certain fugitive binders at crossover points to a cross-lapped array of spaced bundles of inorganic filaments. FIG. 1 is a schematic of such a preform in which assemblage 1 of parallel bundles of inorganic filaments coated with ice overlaps assemblage 2 of parallel bundles of inorganic filaments also coated with ice and is attached thereto at crossovers 3 through bonds of ice. The spacing of filament bundles and the size and shape of the preform are selected so that the preform can be readily inserted in the grid casting mold with the filamentary bundles resting in the mold depressions forming the X and Y direction bars of the grid to be cast. Normally the X and Y bar directions are perpendicular.

The filament bundles of the preform should be made up of inorganic high temperature resistant fibers. In this class are glass, graphite and alumina fiber. The bundles are preferably untwisted or only slightly twisted and should bear little or no finish oils. It is preferred to use alumina fiber and still more preferred to use the lead coated fiber described in Hartmann U.S. Pat. No. 4,282,922 because of the fact that it is more easily wettable by lead or lead alloys. A useful range of reinforcement for the grid is from 1 to 25 volume percent, preferably from 2 to 8 volume percent.

As taught in the concurrently filed and coassigned patent application to H. S. Hartmann, it is preferred that little or no residual foreign matter remain in the battery grid, that is, the grid should consist essentially of lead or lead alloy and the inorganic fiber. Organic residues are particularly undesirable because they interfere with the wetting of the inorganic fiber by the lead or lead alloy. In accordance with the present invention, a fugitive binder having a melting point of at least about 0° C. and a boiling point below about 300° C. is used to bond the filament bundles at crossovers. Ice is preferred since it is inexpensive and has the advantage that it is easily and completely removed after it has served its purpose. Thus, where the frozen preform is placed in the grid casting mold and the mold closed, the ice turns to water. Evacuation of the mold by vacuum to remove air prior to introduction of molten lead or lead alloy, results also in removal of water leaving only the inorganic filament bundles in the grid casting mold. The fugitive binder should preferably be one that is relatively inert at temperatures below its boiling point. Illustrative of such substances are naphthalene, glycerine, ice and dodecanol.

FIG. 2 represents a section of a fixture which may be used to prepare the preform. It is not the same as the mold which is used for casting the battery grid. It may be formed from plastic, metal or other convenient material. As shown, it has two groups of grooves, X and Y, the grooves in each group being essentially parallel and the groups intersecting at essentially right angles in bonding areas T. Holes extend through the fixtures in the bonding areas. In practice, the filament bundles or yarns are laid up by hand or mechanically in the X-direction grooves of the fixture and then in the Y-direction grooves. An assemblage of parallel filament bundles may be prepared in a dispensing cartridge and fed to the fixture directly from the cartridge as a group of bundles. Conveniently the overall configuration of the preform fixture corresponds to that of the battery grid casting mold.

After the filamentary bundles are deposited in the preform fixture, water or other suitable fugitive substance may be introduced to wet the filament bundles. Alternatively, wet filament bundles are laid in the grooves of the preform fixture. In either case, the water on the fiber bundle array is frozen and the ice serves to bond filamentary bundles at crossover points. The preforms are removed and kept frozen until used.

The preforms are next taken to the battery grid casting area and placed in the open molds which are then closed. The casting molds are heated as mentioned previously to prevent premature solidification of the molten metal which is subsequently introduced. A vacuum is then applied to exhaust gases from the mold cavity. Application of vacuum facilitates infiltration of the fiber bundles by the molten metal by removal of air or gases from the mold prior to introduction of the molten metal. Any water or steam flashing off from the ice can escape in a similar manner. Molten lead or lead alloy is then introduced into the mold and allowed to solidify by cooling. The mold is then opened and the battery grid removed making the mold ready to receive the next preform.

The following example is illustrative of the invention and is not intended to limit it in any way.

EXAMPLE I

Lead coated alumina yarn (800 filament, 20 microns per filament) such as described in U.S. Pat. No. 4,282,922 was moved from a bobbin through a water bath thoroughly wetting the fiber bundle. The yarn was cut to the length of each cavity of a freezing fixture shown in FIG. 2, then placed first in one direction and then in the other. The wet fiber in its fixture was then frozen by passing a cold gas over the fiber array or by fogging the fiber array with a stream of solid carbon dioxide particles from a high pressure cylinder. The preform was removed from the fixture by moving ejector pins through the holes in the fixture at the crossover points, freeing the unitary preform. It was then kept in a freezing chamber for storage. This preform geometry matched that of the lead casting mold. This preform was later placed into the casting mold, the mold halves closed, clamped and then preheated in an oven. During the preheat cycle, a vacuum was drawn on the mold cavity to evacuate air and moisture. The mold was then submerged into a pot of lead. Lead was admitted to the mold cavity by removing a plug in a tube entering the bottom of the vertically positioned mold. A freeze plug positioned in the vacuum line stopped lead flow when the mold was full. The mold was then removed from the lead pot and transferred to a cooling station where a water spray was used to expedite cooling. The cast grid was then removed from the mold. The gate and riser were then trimmed, completing the fabrication process.

I claim:

1. A network sheet preform comprising an array of spaced bundles of inorganic filaments superimposed upon and directionally displaced from another array of spaced bundles of inorganic filaments, said arrays being bonded to each other at filament bundle crossover points through bonds of a fugitive binder having a melting point of at least about 0° C. and a boiling point below about 300° C.

2. The preform of claim 1 wherein the inorganic filaments are alumina fibers.

3. The preform of claim 1 wherein the fugitive binder is ice.

4. The preform of claim 1 wherein the bundles of filaments in each array are essentially parallel.

5. The preform of claim 4 wherein the arrays are perpendicular to each other.

6. A method for making a preform comprising depositing bundles of inorganic filaments in the grooves of a fixture having a group of grooves intersecting another group of grooves, wetting the bundles by introducing a fugitive binder at a temperature above its melting point into the grooves, the fugitive binder having a melting point of at least 0° C. and a boiling point below about 300° C., freezing the fugitive binder thereby bonding the filamentary bundles at crossover points and removing the frozen preform from the mold.

7. The method of claim 6 wherein the bundles of filaments are wet with water before being deposited in the grooves of the mold.

* * * * *